(12) United States Patent
Chan et al.

(10) Patent No.: US 9,760,278 B2
(45) Date of Patent: Sep. 12, 2017

(54) FINGER EXPRESSIONS FOR TOUCH SCREENS

(71) Applicant: YAHOO! INC., Sunnyvale, CA (US)

(72) Inventors: Hsuan-Hao Chan, Taipei (TW);
Shih-Ying Chen, Taipei (TW);
Liang-Yu Hsiao, Taipei (TW)

(73) Assignee: Altaba INC., Sunnyvale, CA (US)

( * ) Notice: Subject to any disclaimer, the term of this patent is extended or adjusted under 35 U.S.C. 154(b) by 210 days.

(21) Appl. No.: 13/782,273

(22) Filed: Mar. 1, 2013

(65) Prior Publication Data

US 2014/0247237 A1  Sep. 4, 2014

(51) Int. Cl.
*G06F 3/041* (2006.01)
*G06F 3/0488* (2013.01)

(52) U.S. Cl.
CPC .............. *G06F 3/04883* (2013.01); *G06F 2203/04808* (2013.01)

(58) Field of Classification Search
CPC ............... G06F 3/04833; G06F 2203/04808
USPC ........................................... 345/173
See application file for complete search history.

(56) References Cited

U.S. PATENT DOCUMENTS

| | | | |
|---|---|---|---|
| 7,592,999 B2 | 9/2009 | Rosenberg et al. | |
| 8,098,235 B2 | 1/2012 | Heubel et al. | |
| 8,279,193 B1 * | 10/2012 | Birnbaum et al. | 345/173 |
| 8,743,058 B2 * | 6/2014 | Zhu | 345/168 |
| 2002/0033795 A1 * | 3/2002 | Shahoian et al. | 345/156 |
| 2006/0026536 A1 * | 2/2006 | Hotelling et al. | 715/863 |
| 2007/0097084 A1 * | 5/2007 | Niijima | 345/173 |
| 2008/0216001 A1 * | 9/2008 | Ording et al. | 715/763 |
| 2008/0235788 A1 | 9/2008 | El Saddik et al. | |
| 2009/0189749 A1 | 7/2009 | Saladu | |
| 2010/0169841 A1 * | 7/2010 | Singh | 715/863 |
| 2013/0127738 A1 * | 5/2013 | Miller | G06F 3/0488 345/173 |
| 2014/0168077 A1 * | 6/2014 | Hicks et al. | 345/157 |

FOREIGN PATENT DOCUMENTS

| | | |
|---|---|---|
| CN | 1813237 A | 8/2006 |
| CN | 101655771 A | 2/2010 |
| CN | 102156578 A | 8/2011 |

OTHER PUBLICATIONS

Int. Preliminary Report cited in PCT Application No. PCT/CN2013/000177 dated Aug. 25, 2015, 8 pgs.

* cited by examiner

*Primary Examiner* — Jonathan Boyd
(74) *Attorney, Agent, or Firm* — Cooper Legal Group, LLC

(57) ABSTRACT

A system and method for haptic feedback includes: sensing touch input in at least one area of a touch surface; determining quantitative features of the touch input; determining temporal features of the touch input; and generating a command represented by the quantitative and temporal features of the touch input, said command producing at least one of: an alphanumeric character, a symbol, and an execution instruction.

20 Claims, 11 Drawing Sheets

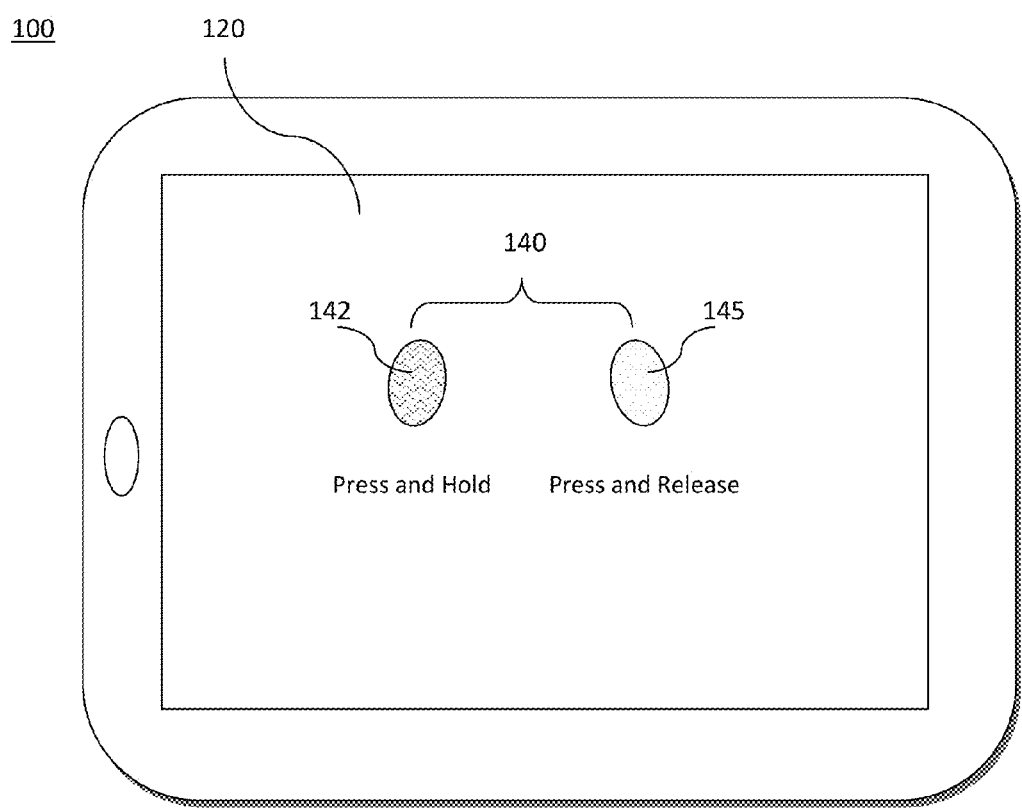
FIG. 1 - "B"

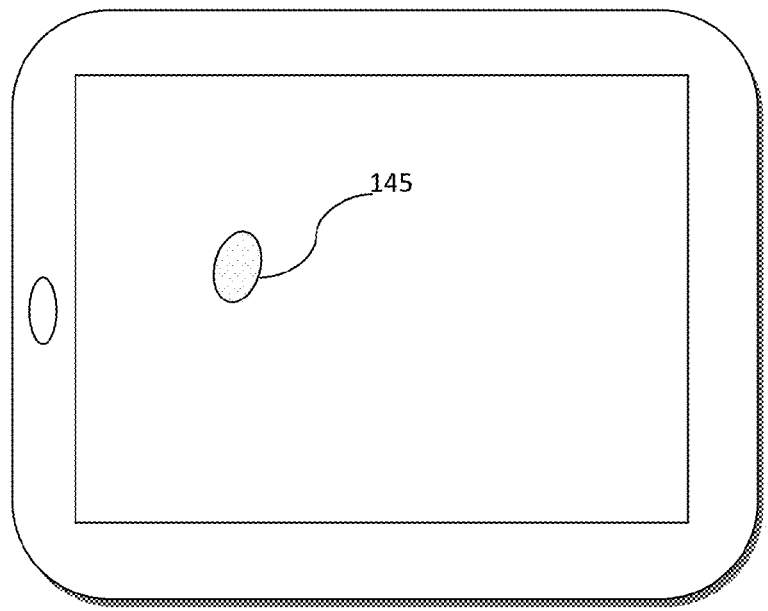
*FIG. 2 - "A"*
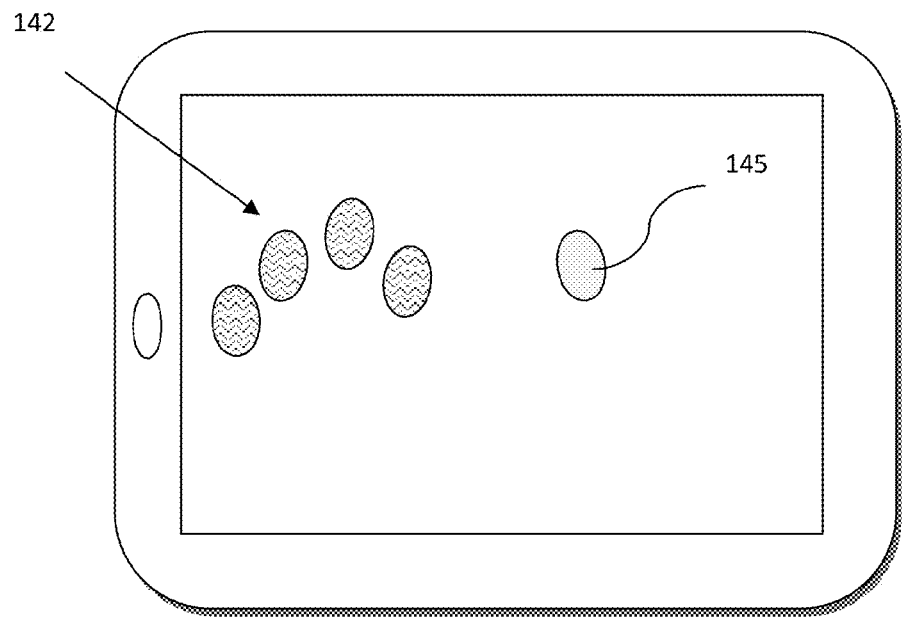
*FIG. 3 - "T"*

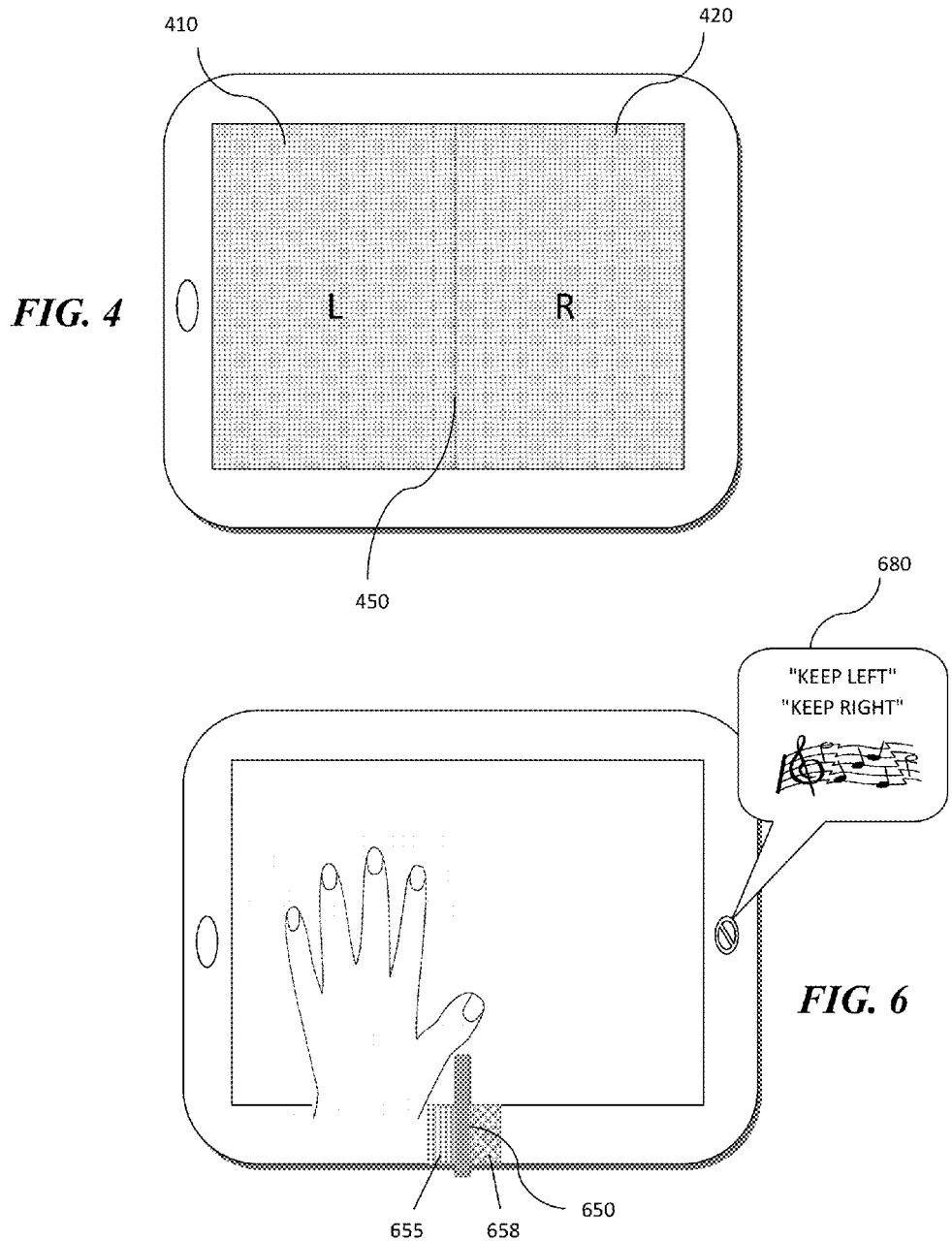

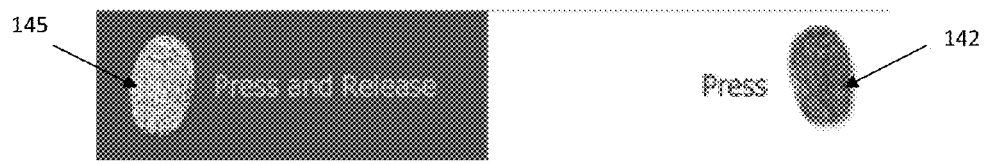
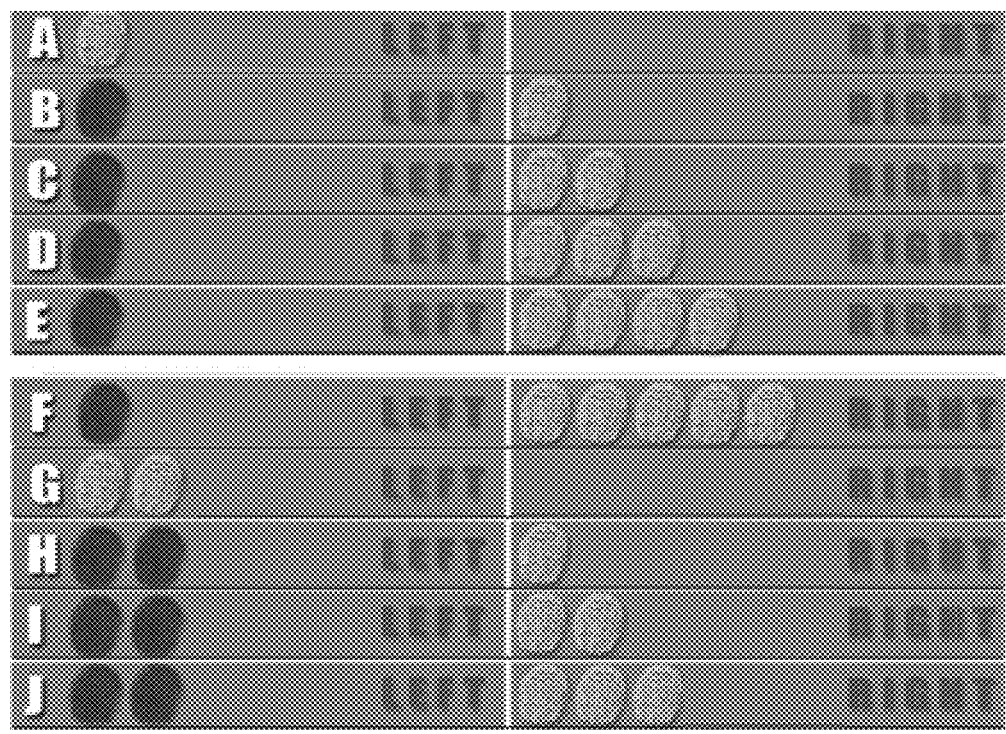
FIG. 5A

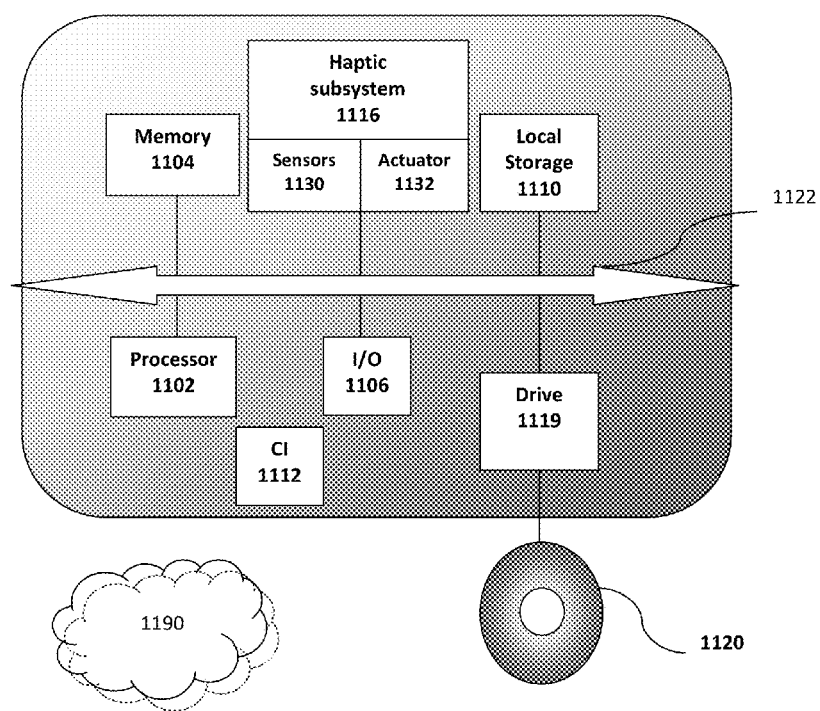
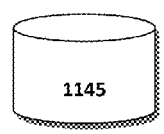
FIG. 11

FINGER EXPRESSIONS FOR TOUCH SCREENS

CROSS-REFERENCE TO RELATED APPLICATIONS

None.

FIELD OF THE INVENTION

The invention disclosed broadly relates to the field of user experience, and more particularly relates to the field of interacting with computers through touch screens as part of the user experience.

BACKGROUND OF THE INVENTION

Currently touch screen user interfaces (UI) rely on virtual keyboards as the input device for the user. In order to operate this virtual keyboard the user must be familiar with the key positions on the keyboard, which in the United States generally follow the QWERTY layout. To use the virtual keyboard efficiently, one must be familiar with the key positions. For the visually impaired, Braille keyboards are an option, but they are expensive and somewhat difficult to operate.

There is a need for an input method that does not required a keyboard, providing easy accessibility to the visually impaired.

SUMMARY OF THE INVENTION

Briefly, according to an embodiment of the present disclosure a method for haptic feedback includes: sensing touch input in at least one area of a touch surface; determining quantitative features of the touch input; determining temporal features of the touch input; and generating a command represented by the quantitative and temporal features of the touch input, said command producing at least one of: an alphanumeric character, a symbol, and an execution instruction.

According to another embodiment of the present disclosure, an information processing system for haptic feedback includes: a touch surface, a haptic feedback subsystem coupled with the touch surface to sense touch input in at least one area of the touch surface; a memory; local storage; and a processor device operably coupled with the memory and the local storage, the processing device performing: determining quantitative features of the touch input; determining temporal features of the touch input; and generating a command represented by the quantitative and temporal features of the touch input, said command producing at least one of: an alphanumeric character, a symbol, and an execution instruction.

According to another embodiment of the present disclosure, a computer readable storage medium with computer-executable instructions stored therein causes a computer to perform: sensing touch input in at least one area of the touch surface; determining quantitative features of the touch input; determining temporal features of the touch input; and generating a command represented by the quantitative and temporal features of the touch input, said command producing at least one of: an alphanumeric character, a symbol, and an execution instruction.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which:

FIG. 1 is a simplified illustration of a device in which embodiments of the present disclosure may be implemented, showing the touch input to generate a command producing the letter "B;"

FIG. 2 is a simplified illustration of the device of FIG. 1 showing the letter "A;"

FIG. 3 is a simplified illustration of the device of FIG. 1 showing the letter "T;"

FIG. 4 is a simplified illustration of a touch panel divided into two areas for touch input, according to an embodiment of the present disclosure;

FIGS. 5A through 5D show finger expression tables for the letters of the alphabet and the numerals zero through nine, according to an embodiment of the present disclosure;

FIG. 5A shows the touch input commands for the letters A through J, according to an embodiment of the present disclosure;

FIG. 5B shows the touch input commands for the letters K through T, according to an embodiment of the present disclosure;

FIG. 5C shows the touch input commands for the letters U through Z, according to an embodiment of the present disclosure;

FIG. 5D shows the touch input commands for the number 0 through 9, according to an embodiment of the present disclosure;

FIG. 6 shows a touch input device with a divider, according to an embodiment of the present disclosure;

FIG. 11 is a high level block diagram showing an information processing system configured to operate according to an embodiment of the present disclosure;

Figure 5B:
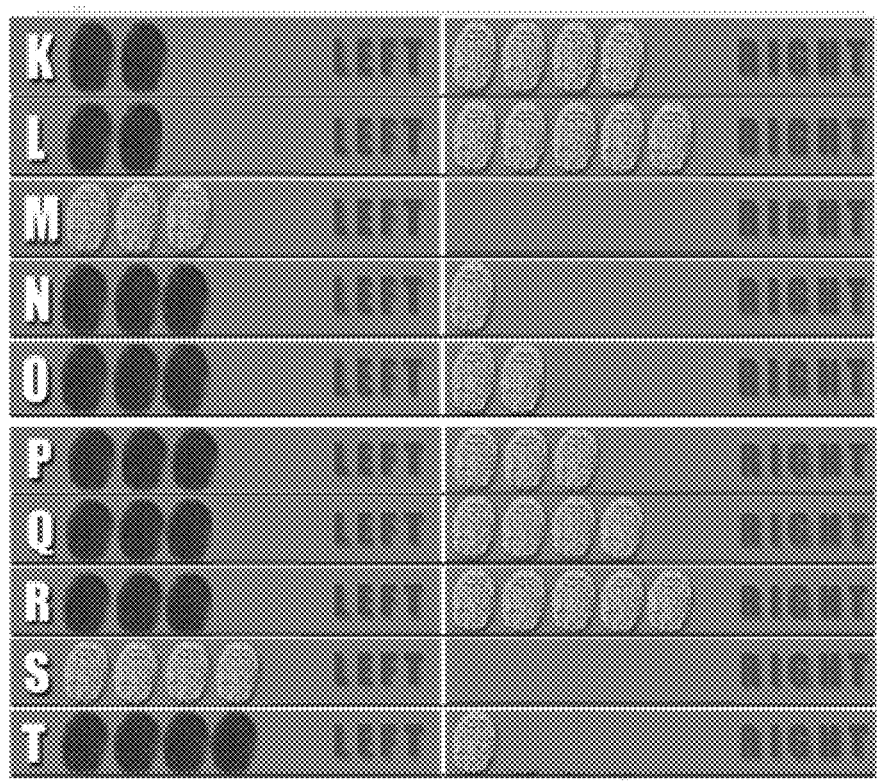

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present disclosure, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe an innovative method to broaden the user experience (UE) by allowing touch input to enter alphanumeric characters and commands, without relying on a virtual keyboard. Our method does not require knowledge of traditional keyboard positions. We allow the user to express commands in a simpler and more intuitive manner. We contemplate implementing embodiments of the disclosure on a tablet computer, laptop computer, as well as multiple smaller devices that are in operative communication with each other.

Referring now to the drawings in detail, and to FIG. 1 in particular, we show an apparatus 100 on which embodiments of the present disclosure may be implemented. In one embodiment, we accommodate touch input from two hands. To accommodate the placement of fingertips from both hands using the one-screen embodiment, we contemplate a tablet-size device as the minimum size for this embodiment. For the two-screen embodiment, smaller devices such as touch-screen enabled mobile phones can be used.

The screen 120 of FIG. 1 shows an exemplary implementation of touch input 140 on a tablet device 100. The ovals 140 represent a touch action on the touch panel 120. The left-hand image on the screen 120 shows a "Press and Hold" symbol 142 (in darker color) for a fingertip action. The image on the right-hand side is a "Press and Release" symbol 145 for a fingertip action. These two touch inputs, when entered together, are interpreted by the processor as a command to produce the letter "B." The user simply uses one finger from the left hand and presses it down for at least one second (Press and Hold), while simultaneously tapping (Press and Release) one finger of the right hand on the right-hand side of the touch screen 120. The processor interprets this action as though the user had typed a letter "B." Without a keyboard, one could easily enter alphanumeric characters, such as this letter "B." To take a very simple example and spell out "BAT," FIGS. 2 and 3 show the finger expressions for the letters "A" and "T," respectively.

Touch Screen.

Referring to FIG. 4, we show a basic illustration of a touch screen 120 which can be any touch screen 120 (touch panel, touch display, touch pad, and the like) that is large enough to accommodate multiple finger taps at the same time. The technology used in this touch screen 120 can be any touch screen technology that is known or contemplated, such as an x-y grid of a transparent electrode layer (shown). Or the touch screen 120 can use ultrasonic wave technology, acoustic wave technology. It can be analog capacitive, resistive, or infrared. Whatever underlying technology that allows the touch screen 120 to recognize a touch and its position on the screen 120 can be used and remain within the spirit and scope of the invention, such as the sensing technology described in U.S. Pat. No. 8,098,234 "Multi-touch Device Having Dynamic Haptic Effects," incorporated in its entirety as if fully set forth herein. The sensing technology is beyond the scope of the invention, and will not be discussed here.

For a full range of alphanumeric capabilities in the one-screen embodiment as shown here in FIG. 4, the touch panel 120 is divided into at least two areas (physically or virtually), according to an embodiment of the present disclosure. It is contemplated that the screen 120 can be further divided to accommodate more touch input, such as fingertip expressions representing executable instructions and images, but for clarity, we focus on the two-area embodiments.

Figure 7:
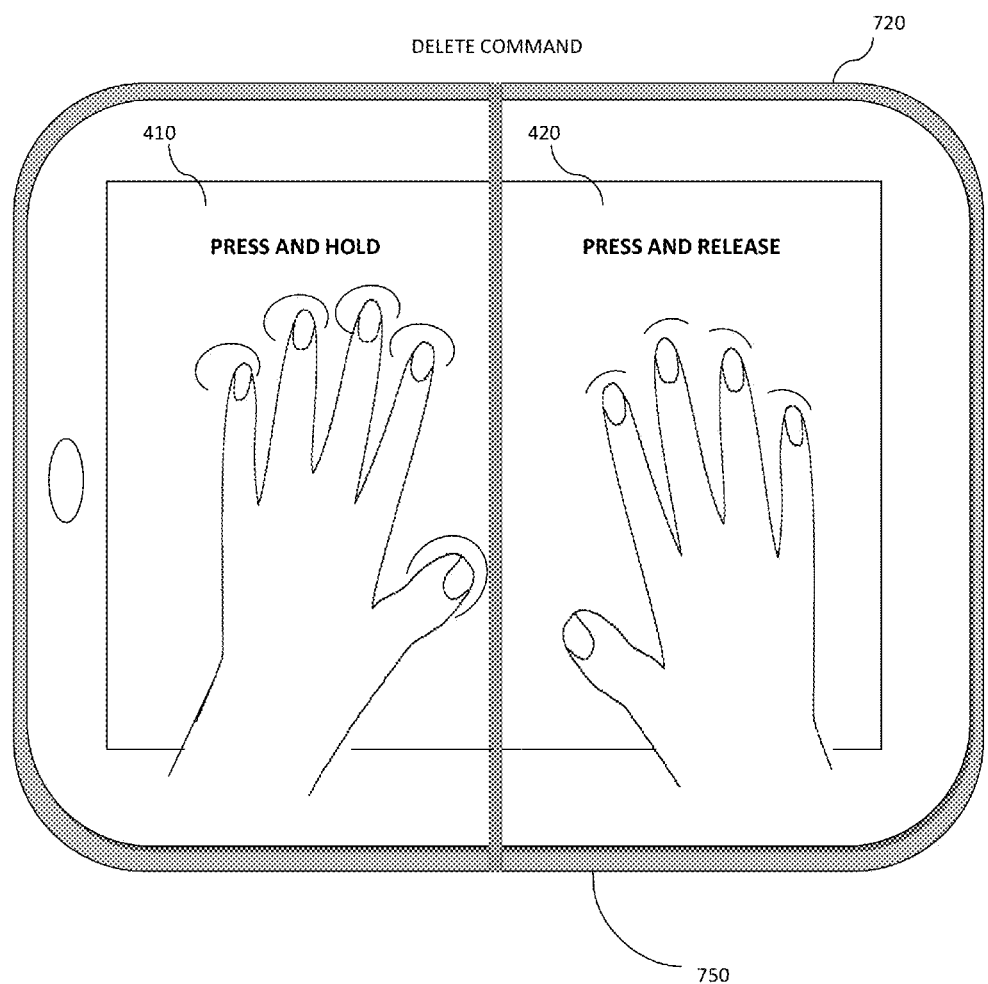
FIG. 7 shows a touch input device with a divider, according to another embodiment of the present disclosure.

FIG. 4 shows the screen 120 divided into two areas: Area L 410 is for the left-hand side of the touch screen 120, and Area R 420 is for the right-hand side of the touch screen 120. For numeric-only expressions, we don't need to divide the touch screen 120 because we only use up to five digits for representing numbers. Also shown in FIG. 4 is an area division 450. This division can be physical, as shown in FIG. 7, or a virtual division, as shown here. The virtual divider 450 can be represented by a line down the middle of the screen 120 when the application for touch input is initiated. With the virtual division, since there is no actual divider to bound the areas 410 and 420, we use an add-on gesture detection. When the user slides one finger on the screen 120 from left-end to right-end (or vice versa) and hits the virtual area division 450, the device 100 utters a voice/sound to alert the user, shown in FIG. 6.

Processing.

Figure 9:
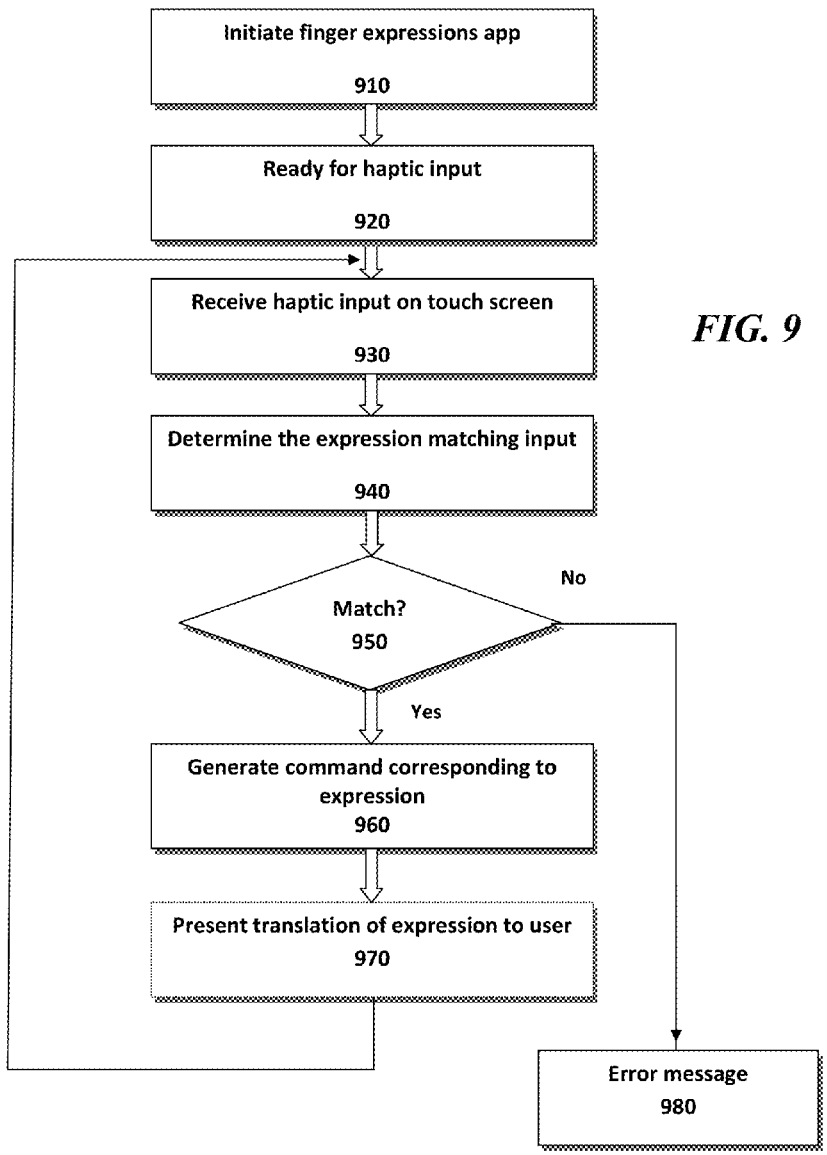
FIG. 9 is a high-level flowchart of a method for fingertip expressions, according to an embodiment of the present disclosure.
Figure 10:
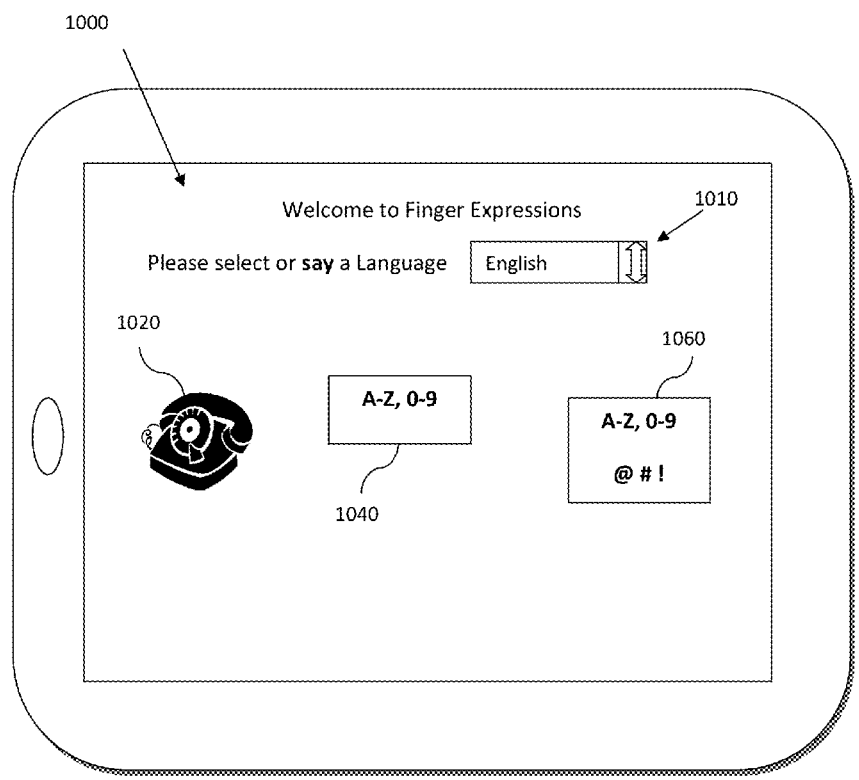
FIG. 10 is a simplified depiction of the initial menu screen for fingertip expressions, according to an embodiment of the present disclosure.

Referring now to the flowchart 900 of FIG. 9, we initialize the touch input application in step 910. This can involve presenting a menu 1000 to the user with options. An example of a menu 1000 is shown in FIG. 10. For example, the user first makes a language selection 1010, which can be spoken. Next, the user can select the type of touch input commands 140 to enter from among at least the following options: the numeric-only option 1020 for dialing telephone numbers or using a calculator function; the alpha-numeric option 1040 for inputting alphanumeric characters; and the enhanced option 1060 which adds special characters such as "@" and "#" for multiple uses, such as tweeting. The enhanced 1060 options allow for entry of commands. After the selections are made, a display area is presented to the user. The display area is touch sensitive.

Referring back to FIG. 9, we are ready to receive touch input in step 920. This can involve either initializing a small buffer to a starting point if this is the beginning of a session; or, advancing to the next place in the buffer if not. In step 930 the device 100 receives the touch input command 140, using touch technology. After the user has input the expressions 140, we analyze the input, match it to a data store or look-up table 500 (see FIGS. 5A-5D) to derive the representative character or instruction in step 940. At this point we can store the character generated by the touch input 140.

Figure 8:
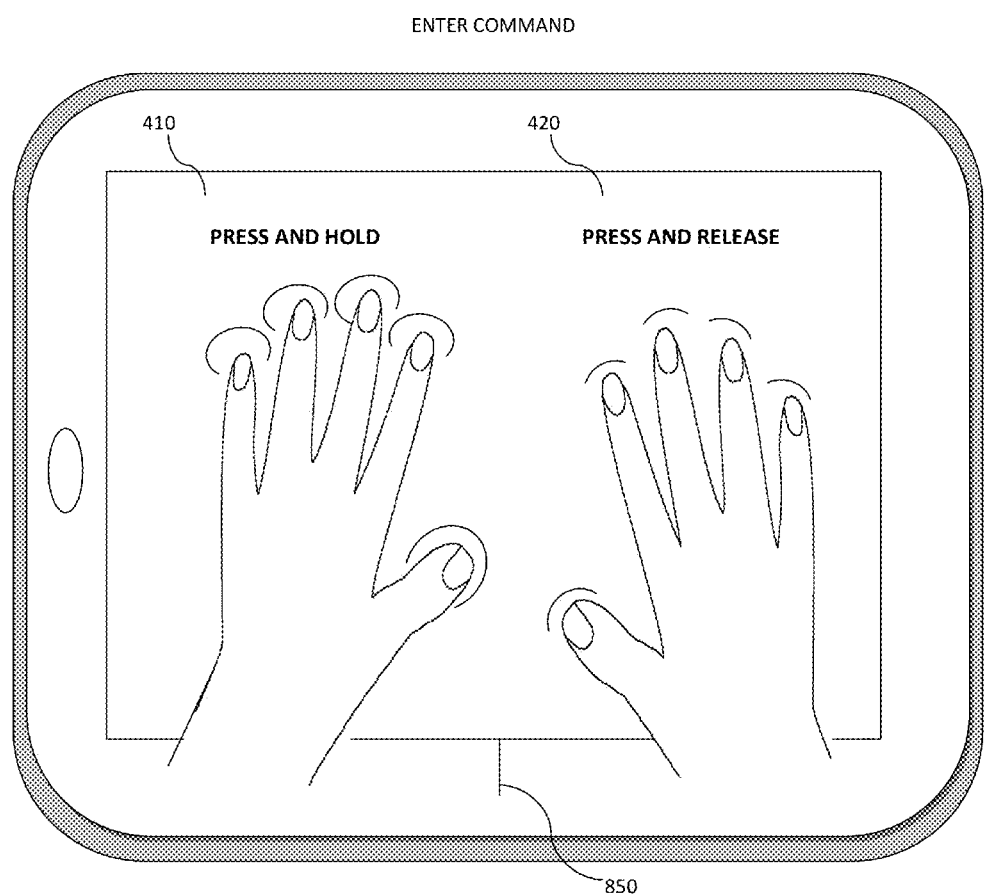
FIG. 8 shows the touch input to generate the ENTER command, according to an embodiment of the present disclosure.

If in step 950 it is determined that the touch input 140 does not match any characters (or commands), then we deliver an error response to the user in step 980. If, however, the touch input 140 is correct, then in step 960 we produce the alphanumeric character, the symbol, or the instruction corresponding to the finger expression. For example, going back to the example of FIG. 1, the finger expression corresponds to the command function to write the letter "B" to memory. In FIG. 8 we show the touch input for the ENTER command, which can be interpreted as end of input sequence, "end of line," "end of word," or "end of file."

In optional step 970 we can output the command matching the touch input 140 by displaying it on the screen 120 or we can use an audio feature of the device 100 to speak the command. This last method would be used for the visually-impaired. In this manner, a visually-impaired person can enter the digits of a phone number and have each one read back to verify correctness before entering the next number. If the audio verification indicates a mistake, the user can then enter the "DELETE" command to try again.

Divider.

In FIGS. 6 and 7 we show two examples of physical area dividers 450. In FIG. 6 the area divider 650 is a raised object (or conversely, an indented line). The raised object 650 could be in the form of a clip attachment that fits onto a pre-set groove or marking on the housing of the device 100. An example of a marking is shown in FIG. 8. Here we do not show the divider 650 extending all the way across the panel 120. Instead, the divider 650 is a small indicator that is positioned at the location where a user might rest the part of the hand between the thumb and the wrist. Additionally, small raised (or indented) lines 655 or dots 658 can be placed on both sides of the divider 650 to serve as a guide. In FIG. 6 we see that the user's finger placement on the left hand is encroaching into the right area 420 R. When this occurs, an alert 680 is provided to the user. This alert 680 is preferably an audio alert, such as a spoken warning "Keep Left," "Keep Right," or a chime or bell, ding, or other sound. The alert 680 can be customized to make a different sound depending on which area is being encroached.

FIG. 7 shows the area divider 750 as part of a housing 720 in which the device 100 is placed. The divider 750 can be part of the housing 720 itself, for example, for a soft housing, the divider 750 can be stretchable strip across the front (similar to a rubber band). The divider 750 may also be separate, but coupled to, the housing 720. In another embodiment the divider 750 attaches directly to the device 100 itself. An indicator on the device 100 such as the line 850 shown in FIG. 8 marks the midway point for placement of a physical divider 750, or just to assist a user with hand placement.

Look Up Table.

FIGS. 5A through 5D show an illustration of an exemplary table 500 of alphanumeric finger expressions 140, according to an embodiment of the present invention. FIG. 5A shows the finger key 145 with the light fingerprint representing a "Press and Release" or "tap" input; and the darker fingerprint 142 representing a "Press and Hold" input, as well as the fingertip expressions 140 for the letters "A" through "J."

1. A=One finger of left hand press and release on area 1.
2. B=One finger of left hand press on area 1 & one finger of right hand press and release on area 2.
3. C/D/E/F=One finger of left hand press on area 1 & two/three/four/five fingers (respectively) of right hand press and release on area 2.
4. G=Two fingers of left hand press and release on area 1.
5. H=Two fingers of left hand press on area 1 & one finger of right hand press and release on area 2.
6. I=Two fingers of left hand press on area 1 & two fingers of right hand press and release on area 2.
7. J=Two fingers of left hand press on area 1 & three fingers of right hand press and release on area 2.

FIG. 5B shows the fingertip expressions 140 representing the letters "K" through "T."

1. K/L=Two fingers of left hand press on area 1 & four/five fingers (respectively) of right hand press and release on area 2.
7. M=Three fingers of left hand press and release on area 1.
8. N=Three fingers of left hand press on area 1 & one finger of right hand press and release on area 2.
9. O/P/Q/R=Three fingers of left hand press on area 1 & two/three/four/five fingers (respectively) of right hand press and release on area 2.
10. S=Four fingers of left hand press and release on area 1.
11. T=Four fingers of left hand press and hold on area 1 & one finger of right hand press and release on area 2.

Figure 5C:
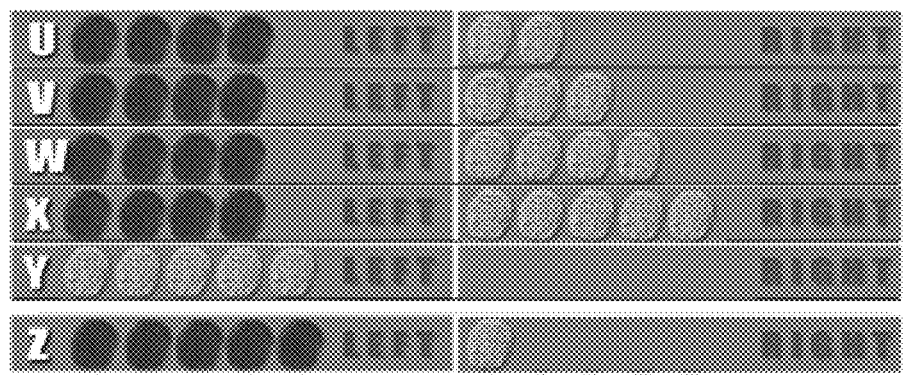

FIG. 5C shows the fingertip expressions 140 representing the letters "U" through "Z."

12. U/V/W/X=Four fingers of left hand press on area 1 & two/three/four/five fingers of right hand press and release on area 2.
13. Y=Five fingers of left hand press and release on area 1.
14. Z=Five fingers of left hand press on area 1 & one finger of right hand press and release on area 2.

Figure 5D:
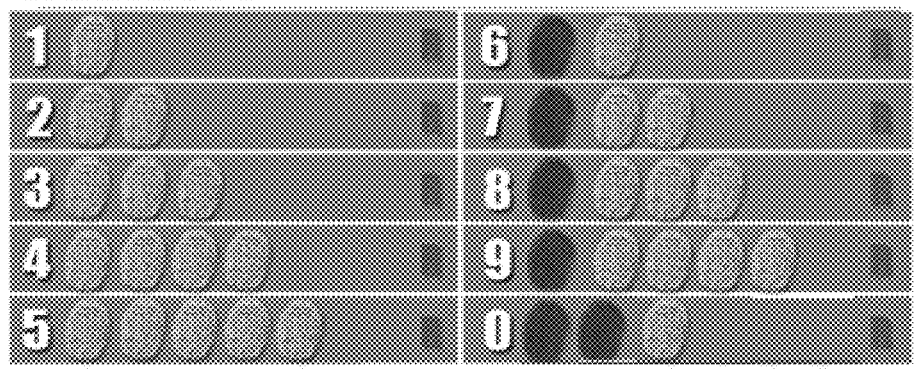

Referring now to FIG. 5D, to enter numbers:
1=One finger press and release
2=Two fingers press and release simultaneously
3=Three fingers press and release simultaneously
4=Four fingers press and release simultaneously
5=Five fingers press and release simultaneously
6=One finger press & (One finger press and release)
7=One finger press & (Two fingers press and release)
8=One finger press & (Three fingers press and release)
9=One finger press & (Four fingers press and release)
0=One finger press & (Five fingers press and release)/Two finger press & (One finger press and release)

Time Limit.

The touch input includes a temporal variable; therefore we set an upper bound for a time limit. We select a reasonable time frame, such as 500 ms, to distinguish a successful input. In selecting the threshold time period, we take into consideration the sensitivity of the touch screen 120. Once a touch is sensed, after 500 ms, we determine what fingertip expressions 140 were entered and convert them to a character.

Commands.

With this technology we can perform selecting, rating, dialing, and so forth by finger expression. Additionally, we can have up to 80 commands enabled using two touch screen areas 410 L and 420 R. More complex combinations are possible by allowing the left area 410 L (the Press and Hold area) to also accept Press and Release, and vice versa. In addition, we can add an option for more than two areas. As an example, we provide DELETE and ENTER commands. These two commands require that the screen 120 be divided (physically or virtually) into two areas 410 L and 420 R because more than five fingers are required to enter each command. The DELETE command functions by backspacing to the last character entered and deleting it. The ENTER command functions similar to a SUBMIT button and signals the end of a word or number sequence input.

Referring again to FIG. 7 we illustrate how a user enters the DELETE command:

5 fingers press and hold on left area 410 L AND 4 fingers press and release on the right area 420 R.

FIG. 8 shows finger expressions for the ENTER command:

5 fingers press and hold on left area 410 L AND 5 fingers press and release on the right area 420 R.

Hardware Embodiment.

Referring now to FIG. 11, we show a high level block diagram of a computer system 1100 on which any of the described embodiments of the present disclosure can be implemented. For purposes of this disclosure, computer system 1100 may represent any type of computer, information processing system or other programmable electronic device, including a client computer, a server computer, a portable computer, a tablet computer, a laptop, a mobile device with telephony, a personal digital assistant, Internet TV, Cloud computing, and the like. The computer system 1100 may be a stand-alone device or networked into a larger system. Computer system 1100, illustrated for exemplary purposes as a stand-alone system, can be in communication with other networked computing devices (not shown) via a network such as the Internet 1190. As will be appreciated by those of ordinary skill in the art, the network may be embodied using conventional networking technologies and may include one or more of the following: local area networks, wide area networks, intranets, public Internet and the like.

Computer system 1100 includes, inter alia, processing device 1102 which communicates with an input/output subsystem 1106, memory 1104, storage 1110, and a link to a network 1190. The processor device 1102 is operably coupled with a communication infrastructure 1122 (e.g., a communications bus, cross-over bar, or network). The processor device 1102 may be a general or special purpose microprocessor operating under control of computer program instructions executed from memory 1104 on program data. The processor 1102 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 1104 may be partitioned or otherwise mapped to reflect the boundaries of the various memory subcomponents. Memory 1104 may include both volatile and persistent memory for the storage of: operational instructions for execution by CPU 1102, data registers, application storage and the like. Memory 1104 preferably includes a combination of random access memory (RAM), read only memory (ROM) and persistent memory such as that provided by a hard disk drive. The computer instructions/applications that are stored in memory 1104 are executed by processor 1102. The computer instructions/applications and program data can also be stored in a hard disk drive for execution by processor device 1102.

The computer system 1100 may also include a communications interface 1112. Communications interface 1112 allows software and data to be transferred between the computer system 1100 and external devices, such as another computer system 1100 or a remote data store 1145. Examples of communications interface 1112 may include a modem, a network interface (such as an Ethernet card), a communications port, a PCMCIA slot and card, etc. Software and data transferred via communications interface 1112 are in the form of signals which may be, for example, electronic, electromagnetic, optical, or other signals capable of being received by communications interface 1112.

A haptic subsystem 1116 is also in operative communication with the processor device 1102, the I/O subsystem 1106, and memory 1104. The haptic subsystem 1116 includes those components necessary for enabling touch screen technology, such as sensors 1130, an actuator 1132 and a touch panel 120.

The computer system 1100 may also include, inter alia, a removable storage drive 1119, representing a floppy disk drive, a magnetic tape drive, an optical disk drive, and the like. The removable storage drive 1119 reads from and/or writes to a removable storage unit 1120 in a manner well known to those having ordinary skill in the art. Removable storage unit 1120, represents a floppy disk, a compact disc, magnetic tape, optical disk, CD-ROM, DVD-ROM, etc. which is read by and written to by removable storage drive 1110. As will be appreciated, the removable storage unit 1120 includes a non-transitory computer readable medium having stored therein computer software and/or data.

Therefore, while there has been described what is presently considered to be the preferred embodiment, it will understood by those skilled in the art that other modifications can be made within the spirit of the disclosure. The above description(s) of embodiment(s) is not intended to be exhaustive or limiting in scope. The embodiment(s), as described, were chosen in order to explain the principles of the disclosure, show its practical application, and enable those with ordinary skill in the art to understand how to make and use the disclosure. It should be understood that the disclosure is not limited to the embodiment(s) described above, but rather should be interpreted within the full meaning and scope of the appended claims.

We claim:

1. A method for generating a command, comprising:
    defining an area divider between a first area and a second area of a touch sensitive display, the first area defined to accept a press-and-release touch action and the second area defined to accept a press-and-hold touch action, the first area and the second area defined to have approximately a same size before receiving one or more touch inputs through the first area or the second area;
    receiving a set of touch inputs through the touch sensitive display after the first area and the second area are defined, the set of touch inputs comprising a combination of a first touch input received as a first press-and-release touch action at a first location through the first area, a second touch input received as a first press-and-hold touch action at a second location through the second area and a third touch input received as a second press-and-hold touch action at a third location through the second area, wherein the second touch input received as the first press-and-hold touch action corresponds to a press at a first time and a release at a second time after the first time, the third touch input received as the second press-and-hold touch action corresponds to a press at a third time and a release at a fourth time after the third time, and the first touch input received as the first press-and-release touch action corresponds to a press at a fifth time and a release at a sixth time after the fifth time, wherein:
        the second time occurs after the third time,
        the fourth time occurs after the first time,
        the fifth time occurs after the first time, after the third time, before the second time, and before the fourth time, and
        the sixth time occurs after the first time, after the third time, before the second time, and before the fourth time;
    identifying at least one of a numeric character, an alphanumeric character, or a special character based upon the combination of the first touch input received as the first press-and-release touch action at the first location through the first area, the second touch input received as the first press-and-hold touch action at the second location through the second area and the third touch input received as the second press-and-hold touch action at the third location through the second area; and generating a command to produce at least one of the numeric character, the alphanumeric character, or the special character.

2. The method of claim 1, the first area defined to correspond to approximately a first half of the touch sensitive display and the second area defined to correspond to approximately a second half of the touch sensitive display.

3. The method of claim 1, comprising:
determining a total number of touch inputs received; and
determining a contact time for each of the touch actions.

4. The method of claim 3, comprising:
identifying at least one of the numeric character, the alphanumeric character, or the special character based upon the total number of touch inputs and the contact time for each of the touch actions.

5. The method of claim 1, the area divider comprising a virtual divider and the method comprising:
displaying the virtual divider on the touch sensitive display; and
responsive to detecting a touch action contacting the virtual divider, producing an alert to notify the user.

6. The method of claim 1, comprising:
receiving a fourth touch input received as a second press-and-release touch action at a fourth location through the first area;
identifying at least one of a second numeric character, a second alphanumeric character, or a second special character based upon the combination of the first touch input, the second touch input, the third touch input and the fourth touch input; and
generating a second command to produce at least one of the second numeric character, the second alphanumeric character, or the second special character.

7. The method of claim 1, comprising:
evaluating a data structure to identify a match between the set of touch inputs and a known set of finger expressions for a known numeric character, a known alphanumeric character, or a known special character specified within the data structure; and
responsive to identifying the match, identifying the numeric character, the alphanumeric character, or the special character corresponding to the set of touch inputs based upon the match; or
responsive to not identifying the match, delivering an error response to the user indicating that the set of touch inputs were not recognized.

8. The method of claim 1, the generating comprising:
utilizing an audio feature to speak at least one of the numeric character, the alphanumeric character, or the special character.

9. The method of claim 1, wherein the area divider comprises a physical divider configured to physically separate the first area from the second area of the touch sensitive display.

10. The method of claim 1, the first area and the second area not corresponding to a virtual keyboard.

11. A system for generating a command, comprising:
a haptic feedback component, coupled with a touch sensitive display and hosted on a device comprising a processing device, local storage, and memory, configured to:
receive a set of touch inputs through the touch sensitive display, the set of touch inputs comprising a combination of a first touch input received as a first press-and-release touch action, a second touch input received as a first press-and-hold touch action and a third touch input received as a second press-and-hold touch action, wherein the second touch input received as the first press-and-hold touch action corresponds to a press at a first time and a release at a second time after the first time, the third touch input received as the second press-and-hold touch action corresponds to a press at a third time and a release at a fourth time after the third time, and the first touch input received as the first press-and-release touch action corresponds to a press at a fifth time and a release at a sixth time after the fifth time, wherein:
the second time occurs after the third time,
the fourth time occurs after the first time,
the fifth time occurs after the first time, after the third time, before the second time, and before the fourth time, and
the sixth time occurs after the first time, after the third time, before the second time, and before the fourth time;
identify at least one of a numeric character, an alphanumeric character, a special character, or an executable instruction based upon the combination of the first touch input received as the first press-and-release touch action, the second touch input received as the first press-and-hold touch action and the third touch input received as the second press-and-hold touch action; and
generate a command to produce at least one of the numeric character, the alphanumeric character, the special character, or the executable instruction.

12. The system of claim 11, the haptic feedback component configured to:
define an area divider between a first area and a second area of the touch sensitive display, the first area defined to accept a press-and-release touch action and the second area defined to accept a press-and-hold touch action, the first area and the second area not corresponding to a virtual keyboard.

13. The system of claim 11, the haptic feedback component configured to:
define an area divider between a first area and a second area of the touch sensitive display, the first area defined to accept a press-and-release touch action and the second area defined to accept a press-and-hold touch action, wherein the area divider comprises a physical divider configured to physically separate the first area from the second area of the touch sensitive display.

14. The system of claim 11, the haptic feedback component configured to:
evaluate a data structure to identify a match between the set of touch inputs and a known set of finger expressions for a known numeric character, a known alphanumeric character, a known special character, or a known executable instruction specified within the data structure; and
responsive to identifying the match, identifying the numeric character, the alphanumeric character, the special character, or the executable instruction corresponding to the set of touch inputs based upon the match.

15. The system of claim 11, the haptic feedback component configured to:
define an area divider between a first area and a second area of the touch sensitive display, the first area defined to accept a press-and-release touch action and the second area defined to accept a press-and-hold touch action, wherein the area divider comprises a virtual divider displayed on the touch sensitive display between the first area and the second area; and alert the user in response to at least one of touch actions contacting the virtual divider, the press-and-hold touch action being received within the second area, or the press-and-release touch action being received within the first area.

16. The system of claim 11, the haptic feedback component configured to:

define an area divider between a first area and a second area of the touch sensitive display, the first area defined to accept a press-and-release touch action and the second area defined to accept a press-and-hold touch action;

determine a number of press-and-release touch actions performed in the first area;

determine a number of press-and-hold touch actions performed in the second area; and identify at least one of the numeric character, the alphanumeric character, the special character, or the executable instruction based upon the number of touch actions performed in each of the first area and the second area.

17. A device configured to perform a method for generating a command, comprising:

receiving a set of touch inputs through a touch sensitive display, the set of touch inputs comprising a combination of a first touch input received as a first press-and-release touch action, a second touch input received as a first press-and-hold touch action and a third touch input received as a second press-and-hold touch action, wherein the second touch input received as the first press-and-hold touch action corresponds to a press at a first time and a release at a second time after the first time, the third touch input received as the second press-and-hold touch action corresponds to a press at a third time and a release at a fourth time after the third time, and the first touch input received as the first press-and-release touch action corresponds to a press at a fifth time and a release at a sixth time after the fifth time, wherein:

the second time occurs after the third time, the fourth time occurs after the first time, the fifth time occurs after the first time, after the third time, before the second time, and before the fourth time, and the sixth time occurs after the first time, after the third time, before the second time, and before the fourth time;

identifying at least one of a numeric character, an alphanumeric character, a special character, or an executable instruction based upon the combination of the first touch input received as the first press-and-release touch action, the second touch input received as the first press-and-hold touch action and the third touch input received as the second press-and-hold touch action; and generating a command to produce at least one of the numeric character, the alphanumeric character, the special character, or the executable instruction.

18. The device of claim 17, the method comprising defining an area divider between a first area and a second area of the touch sensitive display, the first area defined to accept a press-and-release touch action and the second area defined to accept a press-and-hold touch action.

19. The device of claim 18, the first area and the second area not corresponding to a virtual keyboard.

20. The device of claim 18, wherein the area divider comprises a physical divider configured to physically separate the first area from the second area of the touch sensitive display.

* * * * *